(12) United States Patent
Ma et al.

(10) Patent No.: US 9,141,362 B2
(45) Date of Patent: Sep. 22, 2015

(54) METHOD AND APPARATUS TO SCHEDULE STORE INSTRUCTIONS ACROSS ATOMIC REGIONS IN BINARY TRANSLATION

(71) Applicants: Guokai Ma, Shanghai (CN); Yihua Jin, Shanghai (CN); Daniel M. Lavery, Cupertino, CA (US); Jianhui Li, Shanghai (CN)

(72) Inventors: Guokai Ma, Shanghai (CN); Yihua Jin, Shanghai (CN); Daniel M. Lavery, Cupertino, CA (US); Jianhui Li, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 98 days.

(21) Appl. No.: 13/976,929

(22) PCT Filed: Sep. 27, 2012

(86) PCT No.: PCT/CN2012/082139
§ 371 (c)(1),
(2) Date: Jun. 27, 2013

(87) PCT Pub. No.: WO2014/047828
PCT Pub. Date: Apr. 3, 2014

(65) Prior Publication Data
US 2014/0282437 A1   Sep. 18, 2014

(51) Int. Cl.
*G06F 9/45*   (2006.01)
*G06F 9/30*   (2006.01)

(52) U.S. Cl.
CPC ... *G06F 8/52* (2013.01); *G06F 9/30* (2013.01)

(58) Field of Classification Search
CPC ..................................... G06F 9/30; G06F 8/52

USPC .......................................................... 717/136
See application file for complete search history.

(56) References Cited

U.S. PATENT DOCUMENTS

| 6,105,124 | A | 8/2000 | Farber et al. | |
|---|---|---|---|---|
| 6,330,709 | B1 * | 12/2001 | Johnson et al. | 717/100 |
| 6,748,523 | B1 * | 6/2004 | Singh et al. | 712/241 |
| 8,549,504 | B2 * | 10/2013 | Breternitz et al. | 717/153 |

(Continued)

FOREIGN PATENT DOCUMENTS

| CN | 101923492 | 12/2010 |
|---|---|---|
| CN | 102073533 | 5/2011 |
| GB | 2424727 | 10/2006 |

OTHER PUBLICATIONS

International Search Report and Written Opinion for PCT China Patent Application No. PCT/CN2012/082139 Mailed Jul. 11, 2013, 10 Pages.

*Primary Examiner* — Marina Lee
(74) *Attorney, Agent, or Firm* — Nicholson De Vos Webster & Elliott LLP

(57) ABSTRACT

A method and system to support scheduling of memory store instructions across atomic regions in binary translation in a processing unit or processor. In one embodiment of the invention, the processing unit has a store buffer that allows store instructions to be issued in different order than the source binary program order but still retire in source binary program order. This facilitates a small atomic region that maps to each iteration of a source binary code and these atomic regions are joined together into a pipelined region. In one embodiment of the invention, the processing unit executes commit instruction(s) once every loop iteration instead of executing the commit instruction(s) once after the loop exit.

18 Claims, 16 Drawing Sheets

---

402: LOAD res1, [addr1], 1    // INSTR1 (INSTR1, INSTR2, INSTR4 are in their source binary program order)

404: STORE [addr2], val2, 2    // INSTR2

406: COMMIT 2    // INSTR3

408: STORE [addr3], val3, 1 starts from 1)    // INSTR4 (After COMMIT, the COMMIT buffer is cleared and *offset_s*

410: STORE [addr3], val3, 3    // INSTR4 (INSTR4 issued first but made externally visible last)

412: STORE [addr2], val2, 2    // INSTR2 (INSTR1 and INSTR2 will be made externally visible after INSTR3)

414: LOAD res1, [addr1], 1    // INSTR1

416: COMMIT 2 from 3 to 1)    // INSTR3 (COMMIT INSTR1 and INSTR2 and reduce *offset_s* of INSTR4

(56) References Cited

U.S. PATENT DOCUMENTS

| | | | |
|---|---|---|---|
| 8,918,625 B1* | 12/2014 | O'Bleness et al. | 712/216 |
| 2008/0134159 A1* | 6/2008 | Guo et al. | 717/154 |
| 2009/0288075 A1* | 11/2009 | Song et al. | 717/160 |
| 2012/0079245 A1* | 3/2012 | Wang et al. | 712/208 |
| 2012/0079246 A1* | 3/2012 | Breternitz et al. | 712/208 |
| 2013/0262838 A1* | 10/2013 | Al-Otoom et al. | 712/225 |
| 2013/0318507 A1* | 11/2013 | Breternitz et al. | 717/129 |
| 2014/0282437 A1* | 9/2014 | Ma et al. | 717/136 |

\* cited by examiner

302: STORE [address], value, offset_s

304: LOAD dest, [address], offset_l

306: COMMIT count

FIG. 3A

310: STORE [addr1], val1, 1    // INSTR1 (INSTR1, INSTR2, INSTR4 are in their source binary program order)

312: STORE [addr2], val2, 2    // INSTR2

314: COMMIT 2    // INSTR3

316: STORE [addr3], val3, 1    // INSTR4 (After COMMIT, the COMMIT buffer is cleared and offset_s starts from 1)

FIG. 3B

320: STORE [addr3], val3, 3    // INSTR4 (INSTR4 issued first but made externally visible last)

322: STORE [addr2], val2, 2    // INSTR2 (INSTR1 and INSTR2 will be made externally visible after INSTR3)

324: STORE [addr1], val1, 1    // INSTR1

326: COMMIT 2    // INSTR3 (COMMIT INSTR1 and INSTR2 and reduce offset_s of INSTR4 from 3 to 1)

FIG. 3C

402: LOAD res1, [addr1], 1     // INSTR1 (INSTR1, INSTR2, INSTR4 are in their source binary program order)

404: STORE [addr2], val2, 2    // INSTR2

406: COMMIT 2                  // INSTR3

408: STORE [addr3], val3, 1    // INSTR4 (After COMMIT, the COMMIT buffer is cleared and offset_s starts from 1)

FIG. 4A

410: STORE [addr3], val3, 3    // INSTR4 (INSTR4 issued first but made externally visible last)

412: STORE [addr2], val2, 2    // INSTR2 (INSTR1 and INSTR2 will be made externally visible after INSTR3)

414: LOAD res1, [addr1], 1     // INSTR1

416: COMMIT 2 from 3 to 1)     // INSTR3 (COMMIT INSTR1 and INSTR2 and reduce offset_s of INSTR4

FIG. 4B

502: LOAD res1, [addr1], x    // INSTR1 (INSTR1, INSTR2 are in their original program order)
........
504: LOAD res2, [addr2], y    // INSTR2

510: LOAD.s res2, [addr2], y    // INSTR2 (Speculative LOAD.s is used)
........
512: LOAD res1, [addr1], x    // INSTR1
514: LOAD.check res2, [addr2], label1    // INSTR3 [Branch to label1(recovery) if contents are changed]

```
_store((address,value),offset):

if commit-pending>0:
            commitsize = commit – pending +1
    else:
            commitsize = commit – pending + 1 + buffersize
    if offset + commitsize > buffersize:
            STALL
    *(commit + offset) = (address, value)

_commit(count):

commit += count

_load((dest,address),offset):

for store buffer requests from commit + offset to pending:
            if request matches address:
                    store-load bypass to dest
            if not found:
                    load content from memory to dest _rollback:
    For all store buffer element which is not committed:
            change the buffer element to 'invalid'

_flush_to_memory (weakatomicity):
    while pending <= commit:
            put *pending to memory if *pending is a valid request
            pending++;

if atomic region has strong atomicity (inter-processor atomicity) rather than weak atomicity
(single processor atomicity), flush to memory should lock memory bus during the flush:
_flush_to_memory(strongatomicity):
    lock memory bus
    while pending <= commit:
            put *pending to memory if *pending is a valid request
            pending++;
    Unlock memory bus
```

FIG. 7A

Step1: When translating source binary code, when we are generating a new translated instruction, prior to optimization

```
offset=0
For each instruction in super block:
        if new instruction is store addr, value:
                offset = offset + 1
                Generate STORE addr, value, offset
        if new instruction is load addr, value:
                Generate LOAD dest, addr, offset
        if new instruction is commit:
                Generate commit offset
                offset=0
        Other instructions:
                Generate as is
```

Step2: When doing code motion, when move a load or store instruction across one or more commit instructions:

```
For each instruction between new position of load/store and old position of load/store:
        if instruction is commit count {
                if new location is earlier than old location:
                        Add count to offset of the load/store
                if new location is later than old location:
                        Subtract count from offset of the load/store
        }
        if final offset <=0 or offset > store buffer size, return error (code motion cannot be done this way)
```

FIG. 7B

```
802:    LOAD res1, [addr1]           // INSTR1
804:    ADD res1, 3                  // INSTR2
806:    STORE [addr1], res1          // INSTR3
808:    COMMIT                       // INSTR4 (end of region 1)
810:    LOAD res2, [addr2]           // INSTR5
812:    LOAD res3, [addr2+4]         // INSTR6
814:    ADD res2, res3               // INSTR7
816:    STORE [addr2], res2(9)       // INSTR8
818:    LOAD res4, [addr2+8]         // INSTR9
820:    MUL res4, res2               // INSTR10
822:    STORE [addr2+4], res4        // INSTR11
824:    COMMIT                       // INSTR12 (end of region 2)
```

FIG. 8A

```
832:    LOAD res1, [addr1], 0        // INSTR1
834:    ADD res1, 3                  // INSTR2
836:    STORE [addr1], res1, 1       // INSTR3
838:    COMMIT 1                     // INSTR4 (end of region 1)
840:    LOAD res2, [addr2], 0        // INSTR5
842:    LOAD res3, [addr2+4], 0      // INSTR6
844:    ADD res2, res3               // INSTR7
846:    STORE [addr2], res2, 1       // INSTR8
848:    LOAD res4, [addr2+8], 1      // INSTR9
850:    MUL res4, res2               // INSTR10
852:    STORE [addr2+4], res4, 2     // INSTR11
854:    COMMIT 2                     // INSTR12 (end of region 2)
```

FIG. 8B

```
862:    LOAD res1, [addr1], 0        // INSTR1
864:    LOAD res2, [addr2], 1        // INSTR5
866:    LOAD res3, [addr2+4], 1      // INSTR6
868:    LOAD res4, [addr2+8], 2      // INSTR9
870:    ADD res2, res3               // INSTR7
872:    ADD res1, 3                  // INSTR2
874:    MUL res4, res2               // INSTR10
876:    STORE [addr2], res2, 2       // INSTR8
878:    STORE [addr1], res1, 1       // INSTR3
880:    COMMIT 1                     // INSTR4 (end of region 1)
882:    STORE [addr2+4], res4, 2     // INSTR11
884:    COMMIT 2                     // INSTR12 (end of region 2)
```

FIG. 8C

| | | |
|---|---|---|
| 902: | ADD r1, 4 | // INSTR1 |
| 904: | LOAD r2, [r1] | // INSTR2 |
| 906: | STORE [r1+N], r2 | // INSTR3 (make a copy of the content in another array) |
| 908: | ADD r2, 3678 | // INSTR4 |
| 910: | STORE [r1], r2 | // INSTR5 |

FIG. 9A

| | | |
|---|---|---|
| 912: | ADD r1, 4 | // INSTR1 |
| 914: | LOAD r2, [r1], 0 | // INSTR2 |
| 916: | STORE [r1+N], r2, 1 | // INSTR3 (make a copy of the content in another array) |
| 918: | ADD r2, 3678 | // INSTR4 |
| 920: | STORE [r1], r2, 2 | // INSTR5 |
| 922: | COMMIT 2 | // INSTR6 |

FIG. 9B

930:  (INSTR5) STORE [r1], r2, 2; (INSTR4') ADD r2', 3678; (INSTR3") STORE [r1"+N], r2", 5; (INSTR2''') LOAD r2''', [r1'''], 6; (INSTR1'''') ADD r1'''', 4
932:    MOV r1, r1'; MOV r1', r1"; MOV r1", r1'''; MOV r1''', r1''''; MOV r2, r2'; MOV r2', r2"; MOV r2", r2'''; MOV r2''', r2''''; (INSTR6) COMMIT 2;

FIG. 9C

| 1102: | LOAD res1, [addr1]      | // INSTR1 |
| 1104: | ADD res1, 3             | // INSTR2 |
| 1106: | STORE [addr1], res1     | // INSTR3 |
| 1108: | LOAD res2, [addr2]      | // INSTR4 |
| 1110: | ADD res2, res1          | // INSTR5 |
| 1112: | STORE [addr2], res2     | // INSTR6 |
| 1114: | ADD addr1, 4            | // INSTR7 |
| 1116: | ADD addr2, 4            | // INSTR8 |

FIG. 11A

| 1120: | PLOAD vres1, [addr1], 0 | // INSTR1 (Load four 32-bit value from addr1 into vres1, which is a 128 bit register) |
| 1122: | PADD vres1, 3           | // INSTR2 (ADD 3 to each 32-bit value of vres1) |
| 1124: | PSTORE [addr1], vres1, 1 | // INSTR3 (STORE vres1 into addr) |
| 1126: | PLOAD vres2, [addr2], 1 | // INSTR4 |
| 1128: | PADD vres2, vres1       | // INSTR5 |
| 1130: | PSTORE [addr2], vres2, 2 | // INSTR6 |
| 1132: | ADD addr1, 16           | // INSTR7 |
| 1134: | ADD addr2, 16           | // INSTR8 |
| 1136: | COMMIT 2                | // INSTR9 |

METHOD AND APPARATUS TO SCHEDULE STORE INSTRUCTIONS ACROSS ATOMIC REGIONS IN BINARY TRANSLATION

CLAIM OF PRIORITY

This application is a U.S. National Phase application under 35 U.S.C. §371 of International Application No. PCT/CN2012/082139, filed Sep. 27, 2012, entitled "METHOD AND APPARATUS TO SCHEDULE STORE INSTRUCTIONS ACROSS ATOMIC REGIONS IN BINARY TRANSLATION," the entire contents of which are incorporated herein by reference.

FIELD OF THE INVENTION

This invention relates to a processing unit, and more specifically but not exclusively, to a method and apparatus to schedule store instructions across atomic regions in binary translation in the processing unit.

BACKGROUND DESCRIPTION

In the binary translation domain, there are some barriers that hinder aggressive instruction scheduling and software pipelining. For example, one of these barriers in binary translation is the requirement of the guest architecture's memory ordering which is not present in a source to binary compiler. When binary translation is performed on a code with strong memory order instruction set architecture (ISA), the translated code cannot change the order of memory operations such as, store to store, load to load, and load to store, even if there is no dependence between these memory operations. This is to prevent the other processor(s) from seeing their memory changed in a different order compared to the original binary code. In x86 ISA architecture for example, the memory ordering rules do not restrict moving a non-dependent load instruction ahead of a store operation but do restrict moving a non-dependent store instruction ahead of another store instruction.

The atomic region formed between commit instructions or points allow the reordering of load instructions and store instructions inside the atomic region. Some processors support transactional execution in which a region of instructions is executed atomically with all the memory state changed in the region becoming visible at once when a commit instruction is executed. Such transactional execution support allows reordering of memory instructions inside the atomic region without other processors seeing memory changed in a different order.

Software pipelining, which is very efficient in the optimization of code in a compiler, bring lesser benefit in the binary translation domain because of the strong memory order requirements. Software pipelining aggressively reorder instructions across different iterations. For example, a store instruction in a later iteration may need to be reordered before a store instruction or a load instruction in a previous iteration to get a highly compact kernel loop. However, this breaks the store to store (or load to store) ordering and cannot be done in a binary translator. If a binary translator is to follow these memory ordering constraints, the binary translator can only bring less benefit compared to the software pipelining algorithm of a compiler.

BRIEF DESCRIPTION OF THE DRAWINGS

The features and advantages of embodiments of the invention will become apparent from the following detailed description of the subject matter in which:

FIG. 10 is a block diagram of a system according to one embodiment of the invention;

FIG. 3A illustrates a modified target instruction set architecture (ISA) in accordance with one embodiment of the invention;

FIG. 3B illustrates a sample program code in accordance with one embodiment of the invention;

FIG. 3C illustrates a reordered sample program code in accordance with one embodiment of the invention;

FIG. 4A illustrates a sample program code in accordance with one embodiment of the invention;

FIG. 4B illustrates a reordered sample program code in accordance with one embodiment of the invention;

FIG. 7A illustrates a pseudo code of the target ISA in accordance with one embodiment of the invention;

FIG. 7B illustrates an algorithm to generate code that preserves store instruction order in the translated code using the target ISA in accordance with one embodiment of the invention;

FIG. 8A illustrates a sample linear block code in accordance with one embodiment of the invention;

FIG. 8B illustrates the sample linear block code after step one of the algorithm has been applied in accordance with one embodiment of the invention;

FIG. 8C illustrates the sample linear block code after step two of the algorithm has been applied in accordance with one embodiment of the invention;

FIG. 9A illustrates a sample loop body code in accordance with one embodiment of the invention;

FIG. 9B illustrates the sample loop body code after step one of the algorithm has been applied in accordance with one embodiment of the invention;

FIG. 9C illustrates the sample loop body code after step two of the algorithm has been applied in accordance with one embodiment of the invention;

FIG. 11A illustrate a sample loop code in accordance with one embodiment of the invention;

FIG. 11B illustrates the converted vector sample code in accordance with one embodiment of the invention;

DETAILED DESCRIPTION

Figure 1A:
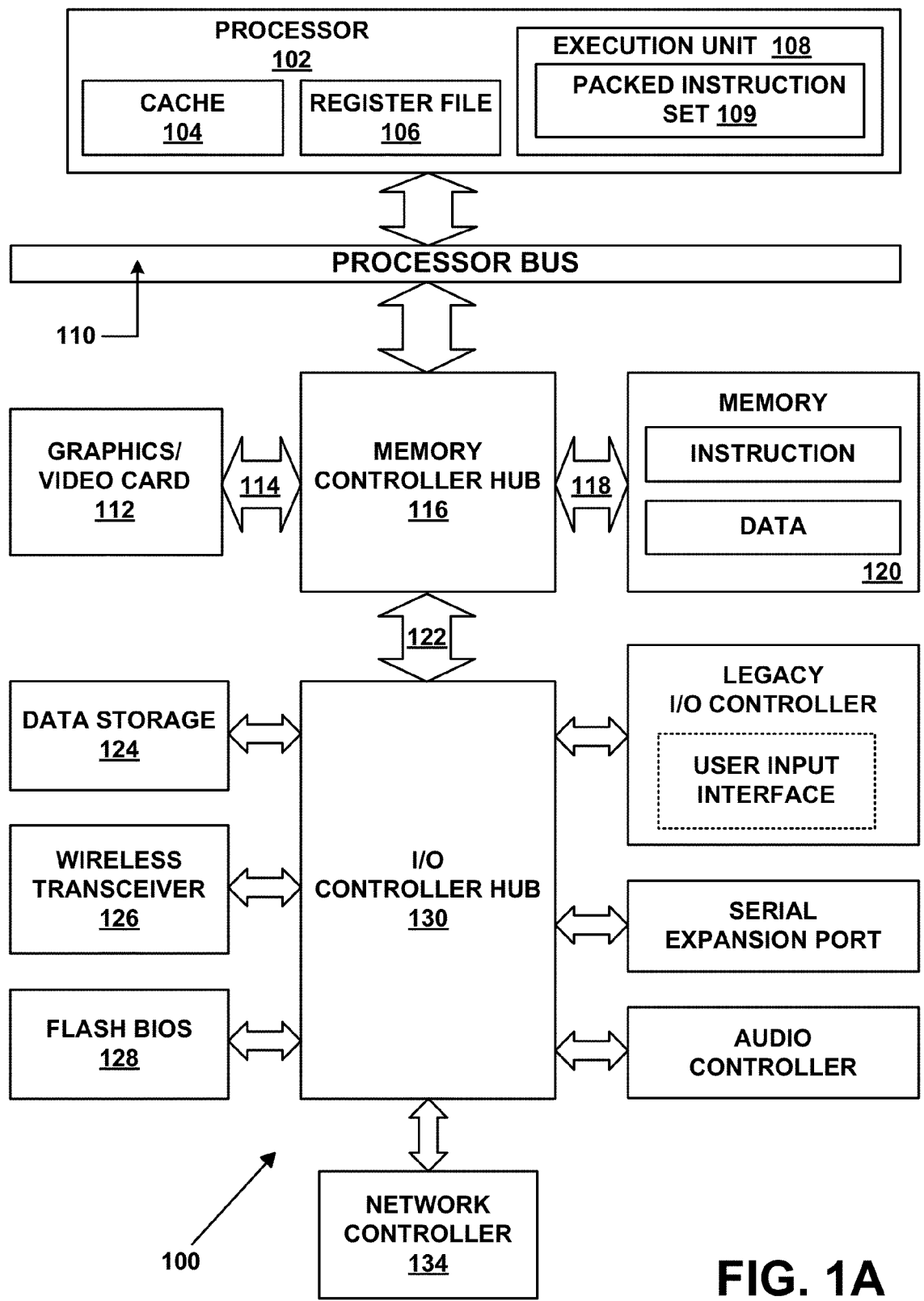
FIG. 1A is a block diagram of a system according to one embodiment of the invention.

The following description describes instructions and processing logic to support scheduling of store instructions across atomic regions in binary translation within or in association with a processor, computer system, or other processing apparatus. In the following description, numerous specific details such as processing logic, processor types, micro-architectural conditions, events, enablement mechanisms, and the like are set forth in order to provide a more thorough understanding of embodiments of the present invention. It will be appreciated, however, by one skilled in the art that the invention may be practiced without such specific details. Additionally, some well-known structures, circuits, and the like have not been shown in detail to avoid unnecessarily obscuring embodiments of the present invention.

Although the following embodiments are described with reference to a processor, other embodiments are applicable to other types of integrated circuits and logic devices. Similar techniques and teachings of embodiments of the present invention can be applied to other types of circuits or semiconductor devices that can benefit from higher pipeline throughput and improved performance. The teachings of embodiments of the present invention are applicable to any processor or machine that performs data manipulations. However, the present invention is not limited to processors or machines that perform 512 bit, 256 bit, 128 bit, 64 bit, 32 bit, or 16 bit data operations and can be applied to any processor and machine in which manipulation or management of data is performed.

In addition, the following description provides examples, and the accompanying drawings show various examples for the purposes of illustration. However, these examples should not be construed in a limiting sense as they are merely intended to provide examples of embodiments of the present invention rather than to provide an exhaustive list of all possible implementations of embodiments of the present invention.

Although the below examples describe instruction handling and distribution in the context of execution units and logic circuits, other embodiments of the present invention can be accomplished by way of a data or instructions stored on a machine-readable, tangible medium, which when performed by a machine cause the machine to perform functions consistent with at least one embodiment of the invention. In one embodiment, functions associated with embodiments of the present invention are embodied in machine-executable instructions. The instructions can be used to cause a general-purpose or special-purpose processor that is programmed with the instructions to perform the steps of the present invention. Embodiments of the present invention may be provided as a computer program product or software which may include a machine or computer-readable medium having stored thereon instructions which may be used to program a computer (or other electronic devices) to perform one or more operations according to embodiments of the present invention. Alternatively, steps of embodiments of the present invention might be performed by specific hardware components that contain fixed-function logic for performing the steps, or by any combination of programmed computer components and fixed-function hardware components.

Instructions used to program logic to perform embodiments of the invention can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

In modern processors, a number of different execution units are used to process and execute a variety of code and instructions. Not all instructions are created equal as some are quicker to complete while others can take a number of clock cycles to complete. The faster the throughput of instructions, the better the overall performance of the processor. Thus it would be advantageous to have as many instructions execute as fast as possible. However, there are certain instructions that have greater complexity and require more in terms of execution time and processor resources. For example, there are floating point instructions, load/store operations, data moves, etc.

As more computer systems are used in internet, text, and multimedia applications, additional processor support has been introduced over time. In one embodiment, an instruction set may be associated with one or more computer architectures, including data types, instructions, register architecture, addressing modes, memory architecture, interrupt and exception handling, and external input and output (I/O).

In one embodiment, the instruction set architecture (ISA) may be implemented by one or more micro-architectures, which includes processor logic and circuits used to implement one or more instruction sets. Accordingly, processors with different micro-architectures can share at least a portion of a common instruction set. For example, Intel® Pentium 4 processors, Intel® Core™ processors, and processors from Advanced Micro Devices, Inc. of Sunnyvale Calif. implement nearly identical versions of the x86 instruction set (with some extensions that have been added with newer versions), but have different internal designs. Similarly, processors designed by other processor development companies, such as ARM Holdings, Ltd., MIPS, or their licensees or adopters, may share at least a portion a common instruction set, but may include different processor designs. For example, the same register architecture of the ISA may be implemented in different ways in different micro-architectures using new or well-known techniques, including dedicated physical registers, one or more dynamically allocated physical registers using a register renaming mechanism (e.g., the use of a Register Alias Table (RAT), a Reorder Buffer (ROB) and a retirement register file. In one embodiment, registers may include one or more registers, register architectures, register files, or other register sets that may or may not be addressable by a software programmer.

In one embodiment, an instruction may include one or more instruction formats. In one embodiment, an instruction format may indicate various fields (number of bits, location of bits, etc.) to specify, among other things, the operation to be performed and the operand(s) on which that operation is to be performed. Some instruction formats may be further broken defined by instruction templates (or sub formats). For example, the instruction templates of a given instruction format may be defined to have different subsets of the instruction format's fields and/or defined to have a given field interpreted differently. In one embodiment, an instruction is expressed using an instruction format (and, if defined, in a given one of the instruction templates of that instruction format) and specifies or indicates the operation and the operands upon which the operation will operate.

Scientific, financial, auto-vectorized general purpose, RMS (recognition, mining, and synthesis), and visual and multimedia applications (e.g., 2D/3D graphics, image processing, video compression/decompression, voice recognition algorithms and audio manipulation) may require the same operation to be performed on a large number of data items. In one embodiment, Single Instruction Multiple Data (SIMD) refers to a type of instruction that causes a processor to perform an operation on multiple data elements. SIMD technology may be used in processors that can logically divide the bits in a register into a number of fixed-sized or variable-sized data elements, each of which represents a separate value. For example, in one embodiment, the bits in a 64-bit register may be organized as a source operand containing four separate 16-bit data elements, each of which represents a separate 16-bit value. This type of data may be referred to as 'packed' data type or 'vector' data type, and operands of this data type are referred to as packed data operands or vector operands. In one embodiment, a packed data item or vector may be a sequence of packed data elements stored within a single register, and a packed data operand or a vector operand may a source or destination operand of a SIMD instruction (or 'packed data instruction' or a 'vector instruction'). In one embodiment, a SIMD instruction specifies a single vector operation to be performed on two source vector operands to generate a destination vector operand (also referred to as a result vector operand) of the same or different size, with the same or different number of data elements, and in the same or different data element order.

SIMD technology, such as that employed by the Intel® Core™ processors having an instruction set including x86, MMX™, Streaming SIMD Extensions (SSE), SSE2, SSE3, SSE4.1, and SSE4.2 instructions, ARM processors, such as the ARM Cortex® family of processors having an instruction set including the Vector Floating Point (VFP) and/or NEON instructions, and MIPS processors, such as the Loongson family of processors developed by the Institute of Computing Technology (ICT) of the Chinese Academy of Sciences, has enabled a significant improvement in application performance (Core™ and MMX™ are registered trademarks or trademarks of Intel Corporation of Santa Clara, Calif.).

FIG. 1A is a block diagram of an exemplary computer system formed with a processor that includes execution unit 108 to execute at least one instruction in accordance with one embodiment of the present invention. System 100 includes a component, such as a processor 102 to employ execution units including logic to perform algorithms for process data, in accordance with the present invention, such as in the embodiment described herein. System 100 is representative of processing systems based on the PENTIUM™ III, PENTIUM™ 4, Xeon™, Itanium™, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 100 may execute a version of the WINDOWS™ operating system available from Microsoft Corporation of Redmond, Wash., although other operating systems (UNIX and Linux for example), embedded software, and/or graphical user interfaces, may also be used. Thus, embodiments of the present invention are not limited to any specific combination of hardware circuitry and software.

Embodiments are not limited to computer systems. Alternative embodiments of the present invention can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

One embodiment may be described in the context of a single processor desktop or server system, but alternative embodiments can be included in a multiprocessor system. System 100 is an example of a 'hub' system architecture. The computer system 100 includes a processor 102 to process data signals. The processor 102 can be a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 102 is coupled to a processor bus 110 that can transmit data signals between the processor 102 and other components in the system 100. The elements of system 100 perform their conventional functions that are well known to those familiar with the art.

In one embodiment, the processor 102 includes a Level 1 (L1) internal cache memory 104. Depending on the architecture, the processor 102 can have a single internal cache or multiple levels of internal cache. Alternatively, in another embodiment, the cache memory can reside external to the processor 102. Other embodiments can also include a combination of both internal and external caches depending on the particular implementation and needs. Register file 106 can store different types of data in various registers including integer registers, floating point registers, status registers, and instruction pointer register.

Execution unit 108, including logic to perform integer and floating point operations, also resides in the processor 102. The processor 102 also includes a microcode (ucode) ROM that stores microcode for certain macroinstructions. For one embodiment, execution unit 108 includes logic to handle a packed instruction set 109. By including the packed instruction set 109 in the instruction set of a general-purpose processor 102, along with associated circuitry to execute the instructions, the operations used by many multimedia applications may be performed using packed data in a general-purpose processor 102. Thus, many multimedia applications can be accelerated and executed more efficiently by using the full width of a processor's data bus for performing operations on packed data. This can eliminate the need to transfer smaller units of data across the processor's data bus to perform one or more operations one data element at a time.

Alternate embodiments of an execution unit 108 can also be used in micro controllers, embedded processors, graphics devices, DSPs, and other types of logic circuits. System 100 includes a memory 120. Memory 120 can be a dynamic random access memory (DRAM) device, a static random access memory (SRAM) device, flash memory device, or other memory device. Memory 120 can store instructions and/or data represented by data signals that can be executed by the processor 102.

A system logic chip 116 is coupled to the processor bus 110 and memory 120. The system logic chip 116 in the illustrated embodiment is a memory controller hub (MCH). The processor 102 can communicate to the MCH 116 via a processor bus 110. The MCH 116 provides a high bandwidth memory path 118 to memory 120 for instruction and data storage and for storage of graphics commands, data and textures. The MCH 116 is to direct data signals between the processor 102, memory 120, and other components in the system 100 and to bridge the data signals between processor bus 110, memory 120, and system I/O 122. In some embodiments, the system logic chip 116 can provide a graphics port for coupling to a graphics controller 112. The MCH 116 is coupled to memory 120 through a memory interface 118. The graphics card 112 is coupled to the MCH 116 through an Accelerated Graphics Port (AGP) interconnect 114.

System 100 uses a proprietary hub interface bus 122 to couple the MCH 116 to the I/O controller hub (ICH) 130. The ICH 130 provides direct connections to some I/O devices via a local I/O bus. The local I/O bus is a high-speed I/O bus for connecting peripherals to the memory 120, chipset, and processor 102. Some examples are the audio controller, firmware hub (flash BIOS) 128, wireless transceiver 126, data storage 124, legacy I/O controller containing user input and keyboard interfaces, a serial expansion port such as Universal Serial Bus (USB), and a network controller 134. The data storage device 124 can comprise a hard disk drive, a floppy disk drive, a CD-ROM device, a flash memory device, or other mass storage device.

For another embodiment of a system, an instruction in accordance with one embodiment can be used with a system on a chip. One embodiment of a system on a chip comprises of a processor and a memory. The memory for one such system is a flash memory. The flash memory can be located on the same die as the processor and other system components. Additionally, other logic blocks such as a memory controller or graphics controller can also be located on a system on a chip.

Figure 1B:
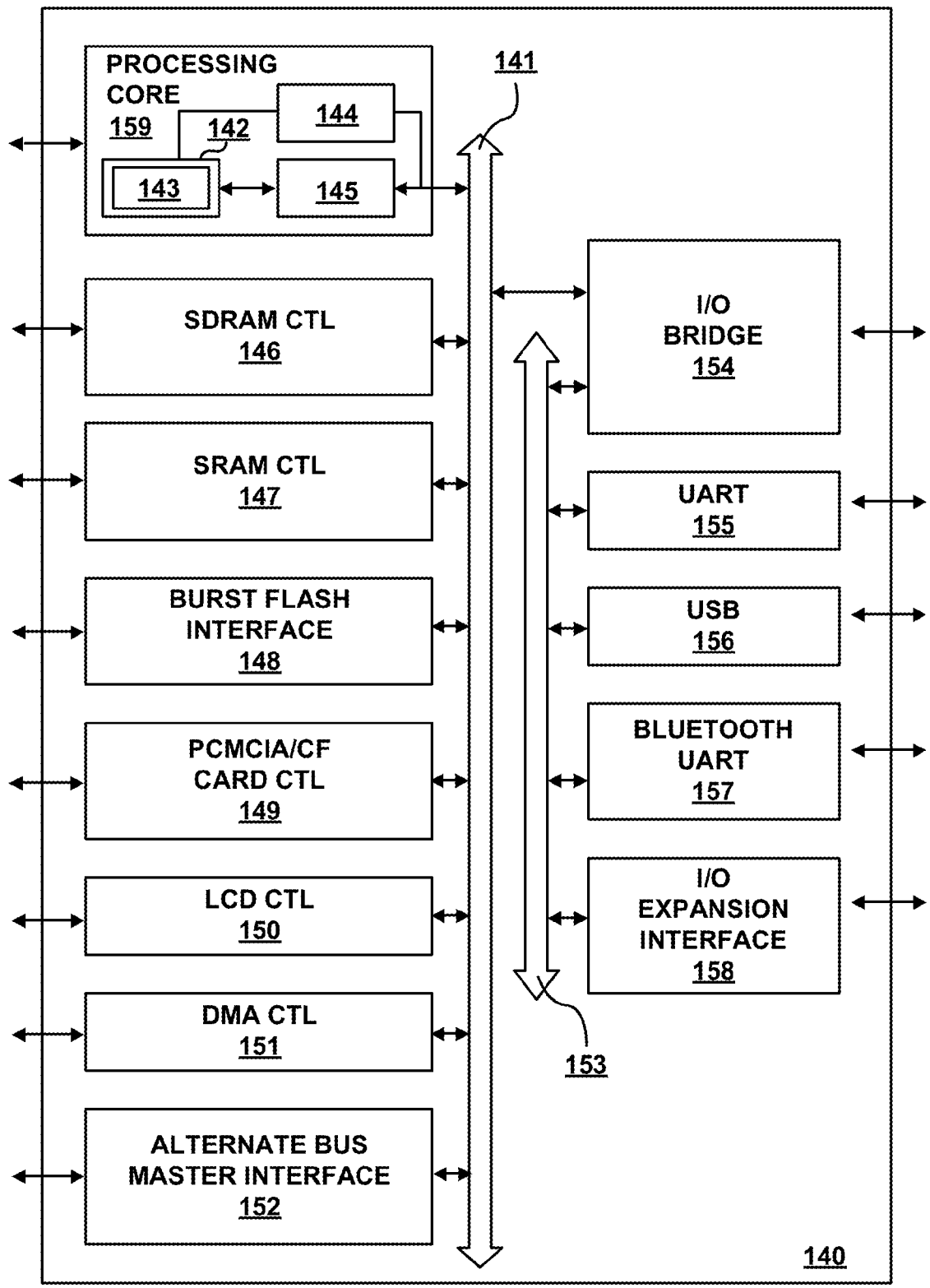
FIG. 1B is a block diagram of a system according to one embodiment of the invention.
Figure 1C:
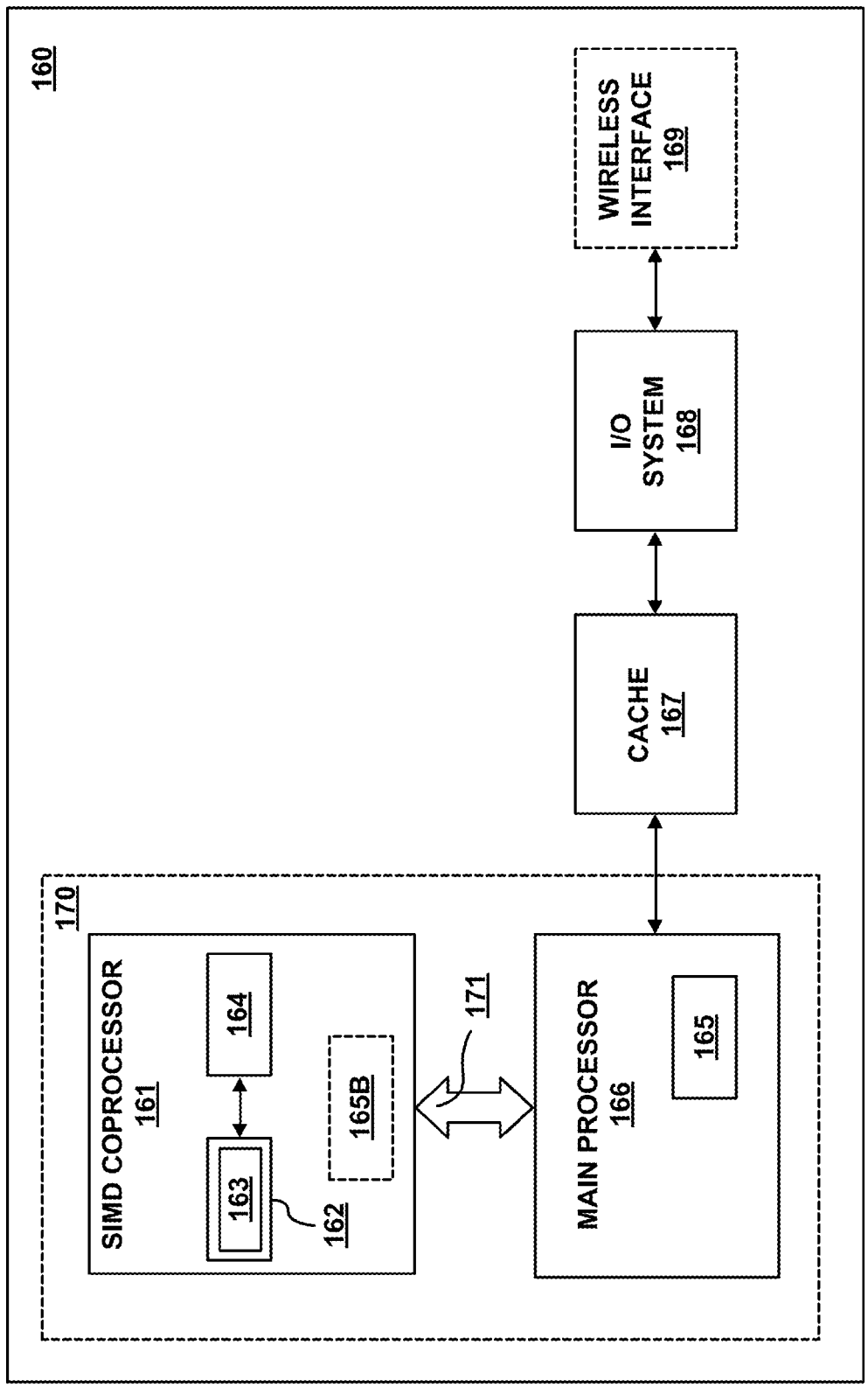

FIG. 1B illustrates a data processing system 140 which implements the principles of one embodiment of the present invention. It will be readily appreciated by one of skill in the art that the embodiments described herein can be used with alternative processing systems without departure from the scope of embodiments of the invention.

Computer system 140 comprises a processing core 159 capable of performing at least one instruction in accordance with one embodiment. For one embodiment, processing core 159 represents a processing unit of any type of architecture, including but not limited to a CISC, a RISC or a VLIW type architecture. Processing core 159 may also be suitable for manufacture in one or more process technologies and by being represented on a machine readable media in sufficient detail, may be suitable to facilitate said manufacture.

Processing core 159 comprises an execution unit 142, a set of register file(s) 145, and a decoder 144. Processing core 159 also includes additional circuitry (not shown) which is not necessary to the understanding of embodiments of the present invention. Execution unit 142 is used for executing instructions received by processing core 159. In addition to performing typical processor instructions, execution unit 142 can perform instructions in packed instruction set 143 for performing operations on packed data formats. Packed instruction set 143 includes instructions for performing embodiments of the invention and other packed instructions. Execution unit 142 is coupled to register file 145 by an internal bus. Register file 145 represents a storage area on processing core 159 for storing information, including data. As previously mentioned, it is understood that the storage area used for storing the packed data is not critical. Execution unit 142 is coupled to decoder 144. Decoder 144 is used for decoding instructions received by processing core 159 into control signals and/or microcode entry points. In response to these control signals and/or microcode entry points, execution unit 142 performs the appropriate operations. In one embodiment, the decoder is used to interpret the opcode of the instruction, which will indicate what operation should be performed on the corresponding data indicated within the instruction.

Processing core 159 is coupled with bus 141 for communicating with various other system devices, which may include but are not limited to, for example, synchronous dynamic random access memory (SDRAM) control 146, static random access memory (SRAM) control 147, burst flash memory interface 148, personal computer memory card international association (PCMCIA)/compact flash (CF) card control 149, liquid crystal display (LCD) control 150, direct memory access (DMA) controller 151, and alternative bus master interface 152. In one embodiment, data processing system 140 may also comprise an I/O bridge 154 for communicating with various I/O devices via an I/O bus 153. Such I/O devices may include but are not limited to, for example, universal asynchronous receiver/transmitter (UART) 155, universal serial bus (USB) 156, Bluetooth wireless UART 157 and I/O expansion interface 158.

One embodiment of data processing system 140 provides for mobile, network and/or wireless communications and a processing core 159 capable of performing SIMD operations including a text string comparison operation. Processing core 159 may be programmed with various audio, video, imaging and communications algorithms including discrete transformations such as a Walsh-Hadamard transform, a fast Fourier transform (FFT), a discrete cosine transform (DCT), and their respective inverse transforms; compression/decompression techniques such as color space transformation, video encode motion estimation or video decode motion compensation; and modulation/demodulation (MODEM) functions such as pulse coded modulation (PCM).

FIG. 10 illustrates yet alternative embodiments of a data processing system capable of performing SIMD text string comparison operations. In accordance with one alternative embodiment, data processing system 160 may include a main processor 166, a SIMD coprocessor 161, a cache memory 167, and an input/output system 168. The input/output system 168 may optionally be coupled to a wireless interface 169. SIMD coprocessor 161 is capable of performing operations including instructions in accordance with one embodiment. Processing core 170 may be suitable for manufacture in one or more process technologies and by being represented on a machine readable media in sufficient detail, may be suitable to facilitate the manufacture of all or part of data processing system 160 including processing core 170.

For one embodiment, SIMD coprocessor 161 comprises an execution unit 162 and a set of register file(s) 164. One embodiment of main processor 165 comprises a decoder 165 to recognize instructions of instruction set 163 including instructions in accordance with one embodiment for execution by execution unit 162. For alternative embodiments, SIMD coprocessor 161 also comprises at least part of decoder 165B to decode instructions of instruction set 163. Processing core 170 also includes additional circuitry (not shown) which is not necessary to the understanding of embodiments of the present invention.

In operation, the main processor 166 executes a stream of data processing instructions that control data processing operations of a general type including interactions with the cache memory 167, and the input/output system 168. Embedded within the stream of data processing instructions are SIMD coprocessor instructions. The decoder 165 of main processor 166 recognizes these SIMD coprocessor instructions as being of a type that should be executed by an attached SIMD coprocessor 161. Accordingly, the main processor 166 issues these SIMD coprocessor instructions (or control signals representing SIMD coprocessor instructions) on the coprocessor bus 166 where from they are received by any attached SIMD coprocessors. In this case, the SIMD coprocessor 161 will accept and execute any received SIMD coprocessor instructions intended for it.

Data may be received via wireless interface 169 for processing by the SIMD coprocessor instructions. For one example, voice communication may be received in the form of a digital signal, which may be processed by the SIMD coprocessor instructions to regenerate digital audio samples representative of the voice communications. For another example, compressed audio and/or video may be received in the form of a digital bit stream, which may be processed by the SIMD coprocessor instructions to regenerate digital audio samples and/or motion video frames. For one embodiment of processing core 170, main processor 166, and a SIMD coprocessor 161 are integrated into a single processing core 170 comprising an execution unit 162, a set of register file(s) 164, and a decoder 165 to recognize instructions of instruction set 163 including instructions in accordance with one embodiment.

Figure 2:
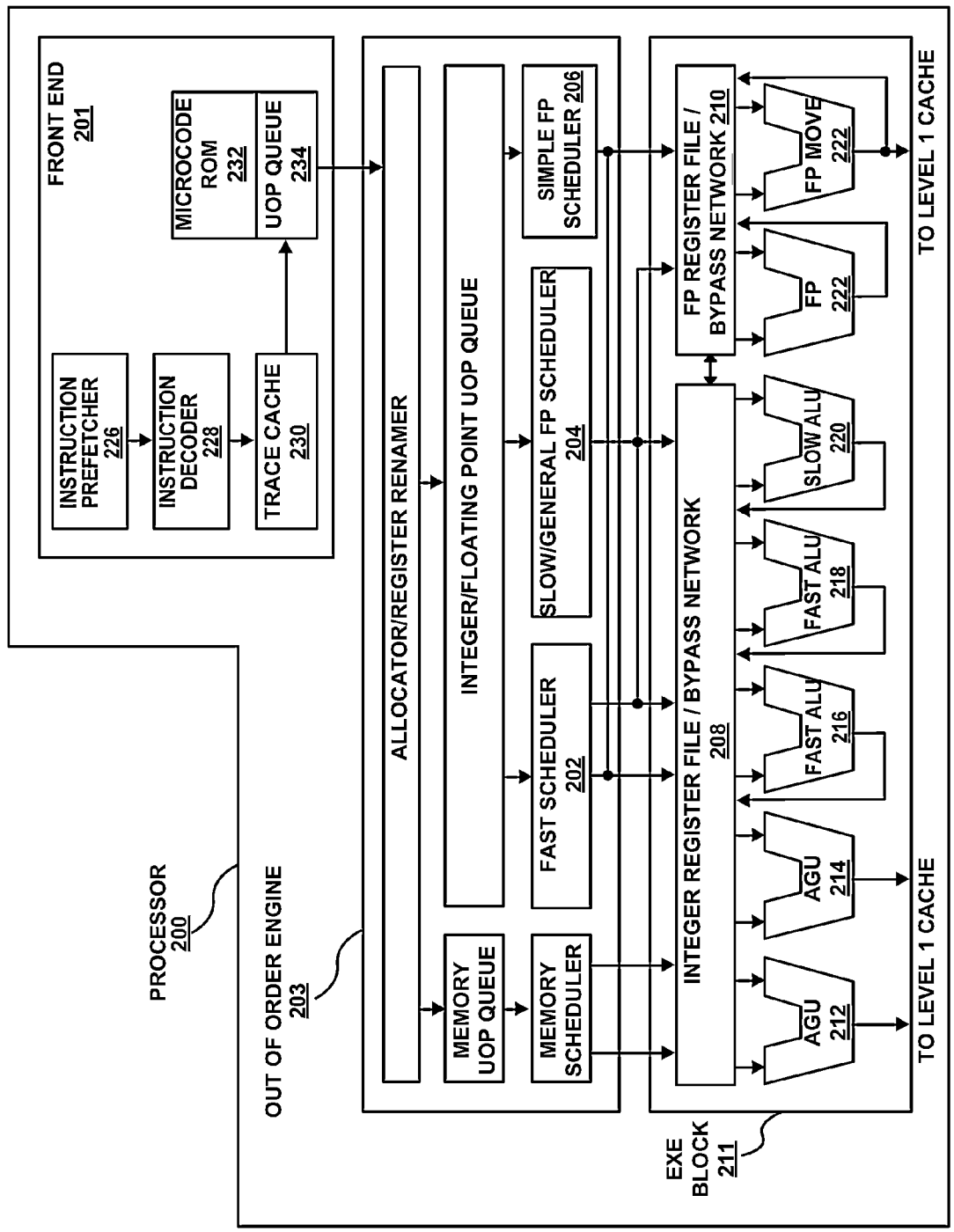
FIG. 2 is a block diagram of a processor according to one embodiment of the invention.

FIG. 2 is a block diagram of the micro-architecture for a processor 200 that includes logic circuits to perform instructions in accordance with one embodiment of the present invention. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 201 is the part of the processor 200 that fetches instructions to be executed and prepares them to be used later in the processor pipeline.

The front end 201 may include several units. In one embodiment, the instruction prefetcher 226 fetches instructions from memory and feeds them to an instruction decoder 228 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 230 takes decoded uops and assembles them into program ordered sequences or traces in the uop queue 234 for execution. When the trace cache 230 encounters a complex instruction, the microcode ROM 232 provides the uops needed to complete the operation.

Some instructions are converted into a single micro-op, whereas others need several micro-ops to complete the full operation. In one embodiment, if more than four micro-ops are needed to complete an instruction, the decoder 228 accesses the microcode ROM 232 to do the instruction. For one embodiment, an instruction can be decoded into a small number of micro ops for processing at the instruction decoder 228. In another embodiment, an instruction can be stored within the microcode ROM 232 should a number of micro-ops be needed to accomplish the operation. The trace cache 230 refers to an entry point programmable logic array (PLA) to determine a correct micro-instruction pointer for reading the micro-code sequences to complete one or more instructions in accordance with one embodiment from the micro-code ROM 232. After the microcode ROM 232 finishes sequencing micro-ops for an instruction, the front end 201 of the machine resumes fetching micro-ops from the trace cache 230.

The out-of-order execution engine 203 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 202, slow/general floating point scheduler 204, and simple floating point scheduler 206. The uop schedulers 202, 204, 206, determine when a uop is ready to execute based on the readiness of their dependent input register operand sources and the availability of the execution resources the uops need to complete their operation. The fast scheduler 202 of one embodiment can schedule on each half of the main clock cycle while the other schedulers can only schedule once per main processor clock cycle. The schedulers arbitrate for the dispatch ports to schedule uops for execution.

Register files 208, 210, sit between the schedulers 202, 204, 206, and the execution units 212, 214, 216, 218, 220, 222, 224 in the execution block 211. There is a separate register file 208, 210, for integer and floating point operations, respectively. Each register file 208, 210, of one embodiment also includes a bypass network that can bypass or forward just completed results that have not yet been written into the register file to new dependent uops. The integer register file 208 and the floating point register file 210 are also capable of communicating data with the other. For one embodiment, the integer register file 208 is split into two separate register files, one register file for the low order 32 bits of data and a second register file for the high order 32 bits of data. The floating point register file 210 of one embodiment has 128 bit wide entries because floating point instructions typically have operands from 64 to 128 bits in width.

The execution block 211 contains the execution units 212, 214, 216, 218, 220, 222, 224, where the instructions are actually executed. This section includes the register files 208, 210, that store the integer and floating point data operand values that the micro-instructions need to execute. The processor 200 of one embodiment is comprised of a number of execution units: address generation unit (AGU) 212, AGU 214, fast ALU 216, fast ALU 218, slow ALU 220, floating point ALU 222, floating point move unit 224. For one embodiment, the floating point execution blocks 222, 224, execute floating point, MMX, SIMD, and SSE, or other operations. The floating point ALU 222 of one embodiment includes a 64 bit by 64 bit floating point divider to execute divide, square root, and remainder micro-ops. For embodiments of the present invention, instructions involving a floating point value may be handled with the floating point hardware. In one embodiment, the ALU operations go to the high-speed ALU execution units 216, 218. The fast ALUs 216, 218, of one embodiment can execute fast operations with an effective latency of half a clock cycle. For one embodiment, most complex integer operations go to the slow ALU 220 as the slow ALU 220 includes integer execution hardware for long latency type of operations, such as a multiplier, shifts, flag logic, and branch processing. Memory load/store operations are executed by the AGUs 212, 214. For one embodiment, the integer ALUs 216, 218, 220, are described in the context of performing integer operations on 64 bit data operands. In alternative embodiments, the ALUs 216, 218, 220, can be implemented to support a variety of data bits including 16, 32, 128, 256, etc. Similarly, the floating point units 222, 224, can be implemented to support a range of operands having bits of various widths. For one embodiment, the floating point units 222, 224, can operate on 128 bits wide packed data operands in conjunction with SIMD and multimedia instructions.

In one embodiment, the uops schedulers 202, 204, 206, dispatch dependent operations before the parent load has finished executing. As uops are speculatively scheduled and executed in processor 200, the processor 200 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data. For the discussions below, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Embodiments of the invention provide a method and apparatus to support scheduling of memory store instructions across atomic regions in binary translation in a processing unit or processor. In one embodiment of the invention, the processing unit has a store buffer that allows store instructions to be issued in different order than the source binary program order but still retire in source binary program order. This facilitates a small atomic region that maps to each iteration of a source binary code and these atomic regions are joined together into a pipelined region. In one embodiment of the invention, the processing unit executes commit instruction(s) once every loop iteration instead of executing the commit instruction(s) once after the loop exit.

In one embodiment of the invention, the processor has logic to perform binary translation of a code having a source binary program order, wherein one or more store instructions of the binary translated code are to be issued in a different order from the source binary program order of the one or more store instructions of the code, and wherein the one or more store instructions of the binary translated code are to be retired in the source binary program order.

In one embodiment of the invention, the processor includes, but is not limited to, a modified target ISA to facilitate the indication of the source binary program store order. In one embodiment of the invention, the processor has a random access gated store buffer to implement the modified target ISA. In another embodiment of the invention, the processor executes an algorithm that generates a translated code that preserve the store order in the original code that utilizes the modified target ISA.

FIG. 3A illustrates a modified target ISA in accordance with one embodiment of the invention. In one embodiment of the invention, the modified target ISA includes, but is not limited to, three ISA primitives.

The first ISA primitive is the store instruction 302. The store instruction 302 has three fields that include, but are not limited to, the address of a memory location, the value to be stored in the memory location and a store offset (offset_s). In one embodiment of the invention, for each store instruction inside an atomic region, the offset_s of the store instruction indicates its source program order. When a store instruction is issued, the offset_s value is associated to the store instruction in one embodiment of the invention. In one embodiment of the invention, a store instruction is not made available or made visible externally to other processing units or cores until all the other store instructions with a smaller offset_s value (including store instructions that have not been issued) are made externally visible.

The second ISA primitive is the load instruction 304. The load instruction 304 has three fields that include, but are not limited to, a destination (dest) register, the address of a memory location where the data at that memory location is to be loaded to the destination register, and a load offset (offset_l). In one embodiment of the invention, each load instruction is allowed to see only store instructions that have an offset_s value smaller or equal than the offset_l value.

In one embodiment of the invention, the store instructions with a bigger offset_s value do not create a value that is dependent on the load instruction offset_l value. If there are no aliasing in the unissued store instructions which are not visible externally, the load instruction acquires its value from the external memory system before all the pending store instructions are externally visible in one embodiment of the invention.

The third ISA primitive is the commit instruction 306. The commit instruction 306 has a count field in one embodiment of the invention. The commit instruction controls which store instructions are visible externally to other processing cores. For example, in one embodiment of the invention, when a commit instruction is executed, all the issued store instructions with a smaller or equal offset_s value than the count value are made externally visible in the order specified by the offset_s value. The other store instructions with a bigger offset_s value remain externally invisible. After the execution of the commit instruction, the associated internal representation of the offset_s value for each previously executed but still non-visible store instruction is subtracted by the count value in one embodiment of the invention.

In one embodiment of the invention, the modified target ISA illustrated in FIG. 3A allows store instructions to be reordered across different atomic regions. In another embodiment of the invention, the modified target ISA illustrated in FIG. 3A allows instruction to be scheduled across the commit instructions. FIGS. 3B and 3C illustrate how a store instruction is moved after another store instruction using the modified target ISA.

FIG. 3B illustrates a sample program code in accordance with one embodiment of the invention. The sample program code has four instructions (INSTR), instruction 1 310, instruction 2 312, instruction 3 314, and instruction 4 316. The sequence of the instructions 1 310, 2 312, and 4 316 is termed as the source or original binary program order in one embodiment of the invention. For instruction 4 316, it is executed after the commit instruction and the offset_s value of the store instruction starts from 1 as the commit buffer is cleared.

FIG. 3C illustrates a reordered sample program code in accordance with one embodiment of the invention. FIG. 3C shows how the sample program code in FIG. 3B is rescheduled while preserving the memory order of the source or original program code. The store instructions 1 324 and 2 322 are swapped without breaking the memory order in the reordered sample program code. The store instruction 4 320 is moved before the commit instruction 3 326 in the reordered sample program code. The binary translator has changed the offset_s value of the store instruction 4 320 from 1 to 3 (increased by the count value of the commit instruction 3 326) allowing it to be moved to a previous atomic region before the commit instruction 3 326. As the count value of the commit instruction 3 326 is set as 2, the store instruction 4 320 is not executed when the commit instruction 3 326 is executed. In one embodiment of the invention, after the commit instruction 3 326 has been executed, the associated internal representation of the offset_s value of the store instruction 4 320 is reduced from 3 to 1 (subtraction of offset_s internal representation by the count value). Thus the internal offset_s value for instruction 4 becomes the same as if instruction 4 had not been moved above the commit instruction 3.

In one embodiment of the invention, the modified target ISA illustrated in FIG. 3A allows a load instruction to be moved or reordered after a store instruction. In another embodiment of the invention, the modified target ISA illustrated in FIG. 3A allows a store instruction to be moved or reordered after a load instruction. FIGS. 4A and 4B illustrate how a load instruction is moved after a store instruction and how a store instruction is moved after a load instruction.

FIG. 4A illustrates a sample program code in accordance with one embodiment of the invention. The sample program code has four instructions (INSTR), instruction 1 402, instruction 2 404, instruction 3 406, and instruction 4 408. The instructions 1 402, 2 404, and 4 408 are in their source or original binary program order. For store instruction 4 408, it is executed after the commit instruction and the offsets value of the store instruction 4 408 starts from 1 as the commit buffer is cleared.

FIG. 4B illustrates a reordered sample program code in accordance with one embodiment of the invention. FIG. 4B shows an example of different types of reordering of the instructions. The first reordering type is the reordering of a load instruction after a store instruction, i.e., moving the store instruction 2 412 before the load instruction 1 414 and moving the store instruction 4 410 before the load instruction 1 414. The second reordering type is the reordering of a store instruction after another store instruction, i.e., moving the store instruction 2 412 after the store instruction 4 410. The third reordering type is the reordering of a commit instruction after a store instruction, i.e., moving the commit instruction 3 416 after the store instruction 4 410.

In the reordered sample program code in FIG. 4B, although the store instruction 2 412 is scheduled before the load instruction 1 414, it is not visible to the memory system before the commit instruction 3 416 is executed. The store instruction 4 410 is not visible until the next commit instruction which is not in this piece of code. The modified target ISA allows the load and store instructions to be reordered without violating the memory order of the source program binary order in one embodiment of the invention.

In one embodiment of the invention, the modified target ISA illustrated in FIG. 3A allows a load instruction to be moved or reordered after another load instruction by using speculative load instructions. For example, in one embodiment of the invention, when a load instruction is reordered before another load instruction, the load is changed to a speculative load instruction and the memory is snooped to determine whether the load address had been overwritten.

Figures 5A, 5B, 6:
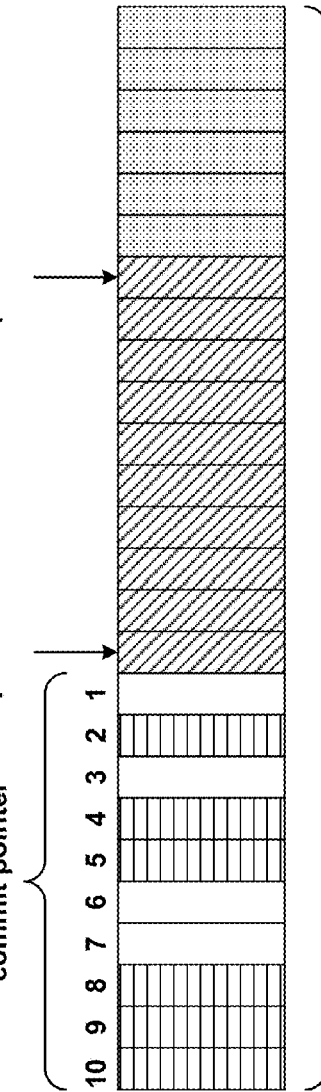
FIG. 5A illustrates a sample program code in accordance with one embodiment of the invention.
FIG. 5B illustrates a reordered sample program code in accordance with one embodiment of the invention.
FIG. 6 illustrates a random access gated store buffer in accordance with one embodiment of the invention.

FIG. 5A illustrates a sample program code in accordance with one embodiment of the invention. The sample program code has two load instructions 1 502 and 2 504.

FIG. 5B illustrates a reordered sample program code in accordance with one embodiment of the invention. FIG. 5B shows that the two load instructions 1 502 and 2 504 are replaced by two speculative load instructions 1 512 and 2 510 respectively. The speculative load instruction 2 510 is reordered before the speculative load instruction 1 512. The speculative check instruction 3 514 is added to check if the contents of the load address had been overwritten or changed. For example, if any write to address 2 happens between the instructions 2 510 and 3 514, the control flow goes to label1 to do recovery to prevent the speculative load instruction from seeing the old contents.

FIG. 6 illustrates a random access gated store buffer 602 in accordance with one embodiment of the invention. In one embodiment of the invention, the random access gated store buffer 602 is used to implement the target ISA modification.

The random access gated store buffer 602 is a store buffer, but it does not work in a first in first out (FIFO) manner in one embodiment of the invention. Instead, it allows store requests to enter the store buffer in a random access manner and leaves the store buffer in a sequential manner in one embodiment of the invention.

The random access gated store buffer 602 has two pointers that point to the store requests in the store buffer. The commit pointer 604 controls which store requests are visible externally. In one embodiment of the invention, only store requests to the right of the commit pointer are made visible externally. The pending pointer 606 points to the store requests that are to be committed first. The random access gated store buffer 602 sends store requests between the pending pointer 606 to the commit pointer 604 using a right to left order into the memory system. All the store requests to the left of the commit pointer 604 are not allowed to be visible externally.

Using the random access gated store buffer 602, a store instruction with an offset_s value is inserted as a store request at the left of the commit pointer 604. The offset_s value of the store instruction determines where the store request is to be inserted. For example, for a store instruction with an offset_s value of 1, it is inserted next to the commit pointer 604 to the left.

When a commit instruction is issued, the commit pointer 604 is moved left by the count value. This allows a count value of store requests to be made visible externally. In one embodiment of the invention, a memory flusher logic or hardware flushes or sends store requests pointed by the pending pointer 606 to the memory system to make these store requests truly visible externally. Each flush moves the pending pointer 606 left by 1 until the pending pointer 606 meets the commit pointer 604.

In one embodiment of the invention, the pending pointer 606 is not visible by the target ISA. In another embodiment of the invention, the pending pointer 606 is not controllable by the target ISA. The store requests between the commit pointer 604 and the pending pointer 604 can be flushed to the memory at any cycle. In one embodiment of the invention, a store request to the right of the commit pointer 604 cannot be taken back or moved to the left of the commit pointer 604.

FIG. 7A illustrates a pseudo code of the target ISA in accordance with one embodiment of the invention. The pseudo code describes the target ISA in one embodiment of the invention. All the pointer calculations are based on the buffer size of the random access gated store buffer 602 and are wrapped around at the buffer boundary of the random access gated store buffer 602.

The pseudo code includes, but is not limited to, the store instruction primitive, the commit instruction primitive, the load instruction primitive, the roll back primitive, the flush to memory primitive for codes with weak atomicity and the flush to memory primitive for codes with strong atomicity. One of ordinary skill in the relevant art will readily appreciate the workings of the pseudo code in FIG. 7A and the workings shall not be described herein.

The random access gated store buffer 602 and the pseudo code described in FIG. 7A allow store instructions to be executed out of order but retire in the original program order.

FIG. 7B illustrates an algorithm to generate code that preserves store instruction order in the translated code using the target ISA in accordance with one embodiment of the invention. The algorithm comprises two steps. The first step generates new target ISA according to the source binary code and the second step adjusts the new ISA instructions at the code motion stage. The first step applies to a loop or a normal linear code. The second step applies for, but not limited to, software pipelining or other kinds of code motion.

The two steps of the algorithm allow the translated binary code to preserve the original memory order and the program semantic in one embodiment of the invention. The first step of the algorithm is used during the code generation stage and the second step of the algorithm is used during any optimization that involves code motion. For example, in one embodiment of the invention, for software pipelining in the binary translation, the first of the algorithm is used to generate the loop and step 2 of the algorithm is used to build the kernel loop.

One of ordinary skill in the relevant art will readily appreciate the workings of the pseudo code in FIG. 7B and the workings shall not be described herein.

Embodiments of the invention can be applied to, but not limited to, a linear block, a software pipelined loop and a loop block. For example, the following FIGS. 8A, 8B, and 8C illustrate how a store instruction can be reordered or scheduled across different atomic regions in a linear block of code.

FIG. 8A illustrates a sample linear block code in accordance with one embodiment of the invention. The sample linear block code has two atomic regions where each commit instruction is at the end of each atomic region. The first atomic region comprises the instructions 1-4 802, 804, 806, 808 and the second atomic region comprises the instructions 5-12 810, 812, 814, 816, 818, 820, 822, 824. Using the new target ISA primitives, store instructions are able to be moved across the commit instruction, i.e., across different atomic regions in one embodiment of the invention.

FIG. 8B illustrates the sample linear block code after step one of the algorithm has been applied in accordance with one embodiment of the invention. In FIG. 8B, the offset_s value is added to each store instruction based on step one of the algorithm, i.e., the store instructions 3 836, 8 846, 11 852 have an offset_s added. Similarly, the offset_l value is added to each load instruction based on step one of the algorithm, i.e., the load instructions 1 832, 5 840, 6 842, 9 848 have an offset_l added. For the commit instructions 4 838, 12 854, the count value is added respectively. One of ordinary skill in the relevant art will readily appreciate how to apply step one of the algorithm to generate the linear code in FIG. 8B and the workings shall not be described herein.

FIG. 8C illustrates the sample linear block code after step two of the algorithm has been applied in accordance with one embodiment of the invention. For each store or load instruction that is moved before a commit instruction, the count value of that commit instruction is added to the offset_s or offset_l value respectively. For example, in FIG. 8C, the load instructions 5 864, 6 866 and 9 868 are moved before the commit instruction 4 880 and the offset_l of these load instructions are added with the count value of the commit instruction 4 880.

For example, the offset_l value of the load instruction 5 840 is zero in FIG. 8B. After step two of the algorithm has been applied, the offset_l value of the load instruction 5 840 is added with the count value of the commit instruction 4 880 and the new offset_l value of the load instruction 5 864 becomes 1.

Similarly, in FIG. 8C, the store instruction 8 876 is moved before the commit instruction 4 880 and the offset_s of the store instruction is added with the count value of the commit instruction 4 880.

After the commit instruction 4 880 is executed, the store instruction 8 876 is not in a committed status yet because the offset_s value is higher than the count value of the commit instruction 4 880. The internal representation of the offset_s value of the store instruction 8 876 is subtracted by the count value of the commit instruction 4 880 after the execution of the commit instruction 4 880. When the commit instruction 12 884 has been executed, the store instruction 8 876 is made visible externally.

FIG. 8C illustrates that the store instructions can be reordered across different atomic regions and yet still retain the original source program or memory order.

In another example, the following FIGS. 9A, 9B, and 9C illustrate an example of a software pipelined loop that preserves the memory order. FIG. 9A illustrates a sample loop body code in accordance with one embodiment of the invention. The sample loop body code adds 3678 to an array of integers and makes a copy of the content in another array of integers.

FIG. 9B illustrates the sample loop body code after step one of the algorithm has been applied in accordance with one embodiment of the invention. After step one of the algorithm has been applied, the sample loop body code is transformed to a loop where each iteration is an atomic region.

FIG. 9C illustrates the sample loop body code after step two of the algorithm has been applied in accordance with one embodiment of the invention. FIG. 9C illustrates the loop body code after building the kernel and applying step two of the algorithm. In the line 930, the instructions 1-5 are placed in one line to indicate that there is instruction level parallelism. Each symbol' added to each instruction indicate the number of iterations that the instruction is moved ahead or earlier.

For example, in line 930, instruction 4 is moved one iteration ahead and it is indicated as INSTR4', instruction 3 is moved two iteration ahead and it is indicated as INSTR3", instruction 2 is moved three iteration ahead and it is indicated as INSTR3'" and instruction 1 is moved four iterations ahead and it is indicated as INSTR1'".

The instructions are moved across one commit instruction for each iteration they are moved ahead or earlier. For example, since load instruction 2 is moved three iteration earlier and it moved across the commit instruction 6 932 three times. The offset_l of load instruction 2 is increased by 6 (3×count value of commit instruction 6 932)

Similarly, the offset_s of store instruction 3 is increased by 4 (2×count value of commit instruction 6 932) as it is moved two iterations earlier. In this example, the offset_l of the load instruction 2 is to prevent unnecessary bypass, in this case no store is lifted above load thus the offset is the biggest in the kernel, i.e., no bypass is blocked.

The FIGS. 10A-10D illustrate how the contents in the random access gated store buffer 602 change with the execution of the instructions. The number in the entry is the instruction number associated with the store request.

Figure 10A:
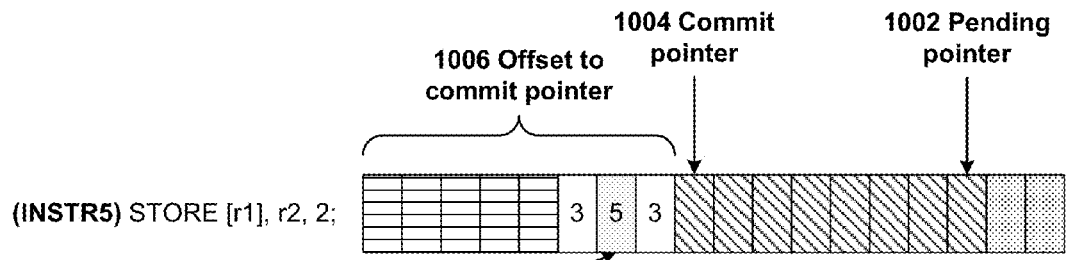
FIG. 10A illustrate the contents of the random access gated store buffer in accordance with one embodiment of the invention.

FIG. 10A illustrate the contents of the random access gated store buffer 602 in accordance with one embodiment of the invention. In FIG. 10A, it illustrates that the store instruction 5 (INSTR5) has an offset_s value of 2 and the store request associated with the store instruction 5 is inserted in the slot 1008 which is two slots to the left of the commit pointer 1004. The slot 1008 is indicated by the number 5 in FIG. 10A.

Figure 10B:
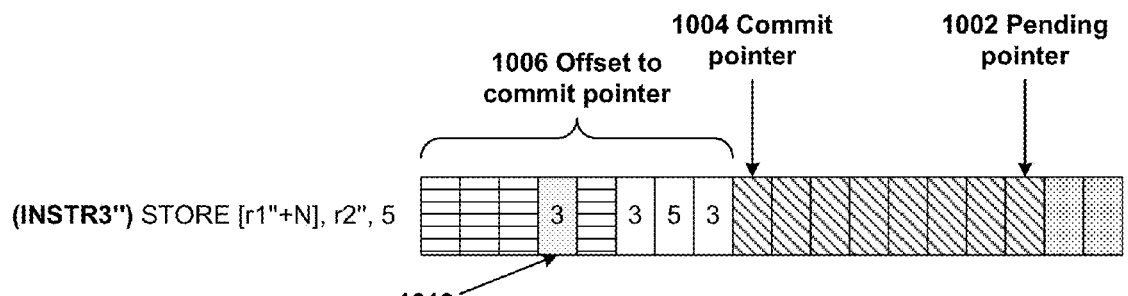
FIG. 10B illustrate the contents of the random access gated store buffer in accordance with one embodiment of the invention.
Figure 10C:
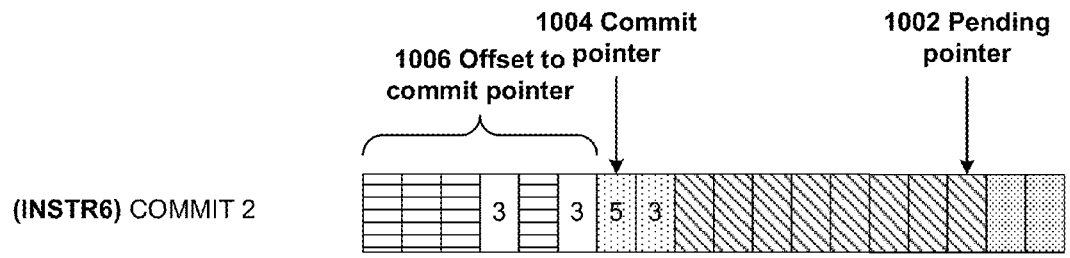
FIG. 10C illustrate the contents of the random access gated store buffer in accordance with one embodiment of the invention.

FIG. 10B illustrate the contents of the random access gated store buffer 602 in accordance with one embodiment of the invention. In FIG. 10B, it illustrates that the store instruction 3 (INSTR3") has an offset_s value of 5 and the store request associated with the store instruction 3" is inserted in the slot 1010 which is five slots to the left of the commit pointer 1004. The slot 1010 is indicated by the number 3 in FIG. 10A.

FIG. 100 illustrate the contents of the random access gated store buffer 602 in accordance with one embodiment of the invention. In FIG. 100, it illustrates the execution of the commit instruction with a count value of 2. After the execution of the commit instruction, the commit pointer 1004 is moved two slots to the left. The store requests that are to the right of the commit pointer 1004 are made available externally in one embodiment of the invention.

Figure 10D:
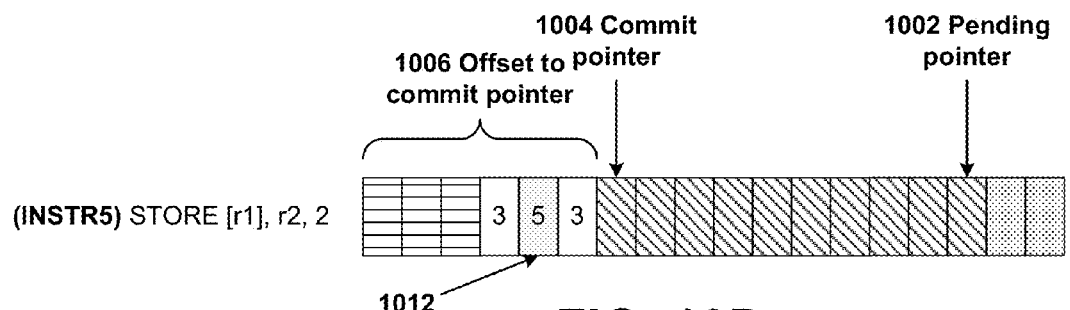
FIG. 10D illustrate the contents of the random access gated store buffer in accordance with one embodiment of the invention.

FIG. 10D illustrate the contents of the random access gated store buffer 602 in accordance with one embodiment of the invention. In FIG. 10D, it illustrates that the next iteration of the store instruction 5 (INSTR5). The store instruction 5 has an offset_s value of 2 and the store request associated with the store instruction 5 is inserted in the slot 1012 which is two slots to the left of the commit pointer 1004. The slot 1012 is indicated by the number 5 in FIG. 10A.

FIGS. 10A-10D are not meant to be limiting and only serves as illustration of the workings of the embodiments of the invention. Embodiments of the invention allow the store instruction in a later iteration to be reordered before a store instruction or a load instruction in a previous iteration to get a highly compact kernel loop. This facilitates the software pipelining in a strong memory order ISA in one embodiment of the invention.

In one embodiment of the invention, the vector instructions are compatible with the workings of the inventions. FIG. 11A illustrate a sample loop code in accordance with one embodiment of the invention.

Assuming that the sample loop code is working with 32 bits operand, the sample loop code is unrolled 4 times and folded into vector operations of 128 bits operands. The store, add and store instructions are converted into vector format and the commit instruction is inserted to ensure the original program order. FIG. 11B illustrates the converted vector sample code in accordance with one embodiment of the invention. One of ordinary skill in the relevant art will readily appreciate the workings of the converted vector sample code in FIG. 11B and it shall not be described herein.

Figure 12:
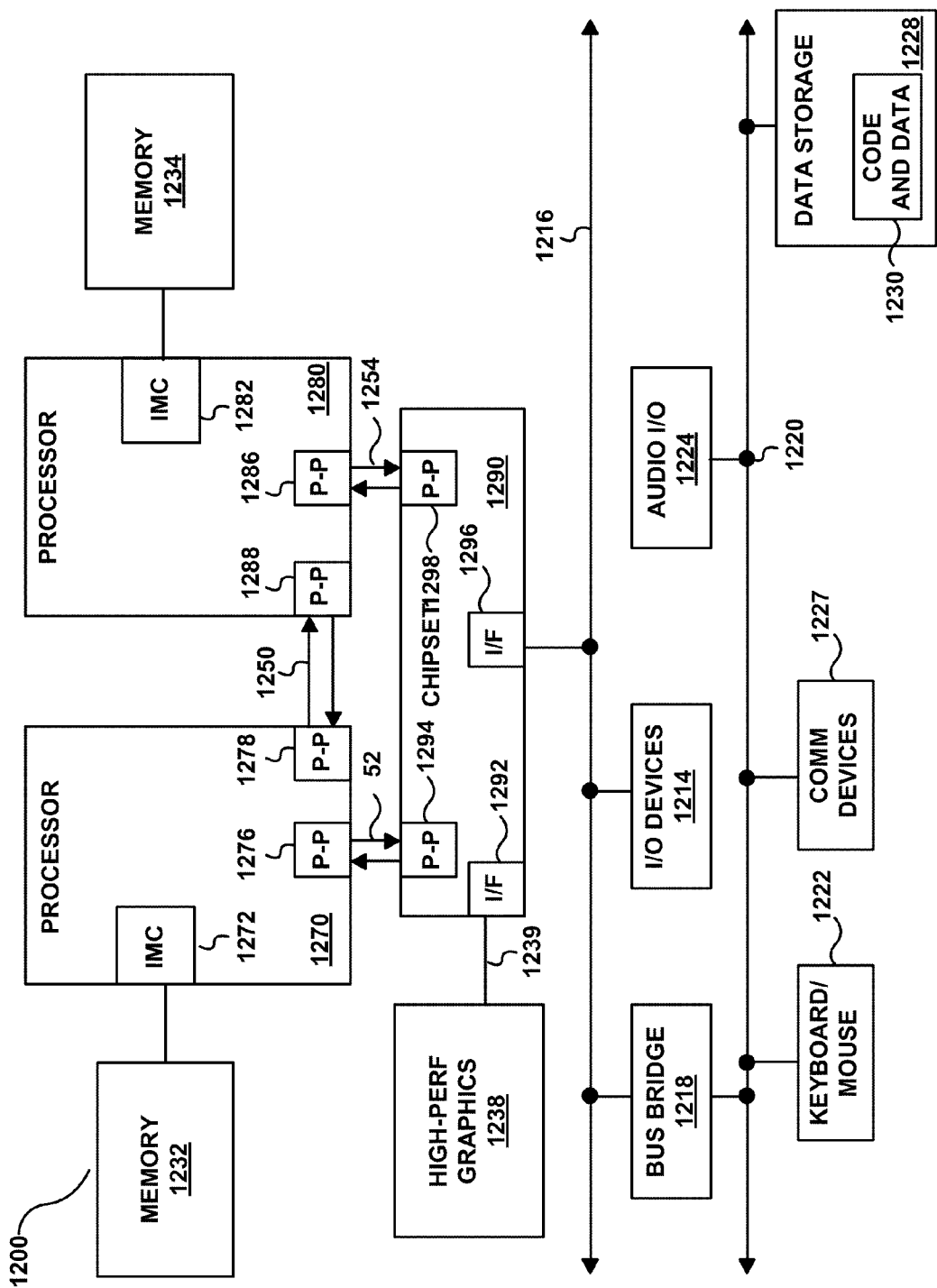
FIG. 12 illustrates a block diagram of a system in accordance with one embodiment of the invention.

FIG. 12 illustrates a block diagram of a system 1200 in accordance with one embodiment of the invention. As shown in FIG. 12, multiprocessor system 1200 is a point-to-point interconnect system, and includes a first processor 1270 and a second processor 1280 coupled via a point-to-point interconnect 1250. While shown with only two processors 1270, 1280, it is to be understood that the scope of the present invention is not so limited. In other embodiments, one or more additional processors may be present in a given processor.

Processors 1270 and 1280 are shown including integrated memory controller (IMC) units 1272 and 1282, respectively. Processor 1270 also includes as part of its bus controller units point-to-point (P-P) interfaces 1276 and 1278; similarly, second processor 1280 includes P-P interfaces 1286 and 1288. Processors 1270, 1280 may exchange information via a point-to-point (P-P) interface 1250 using P-P interface circuits 1278, 1288. As shown in FIG. 12, IMCs 1272 and 1282 couple the processors to respective memories, namely a memory 1232 and a memory 1234, which may be portions of main memory locally attached to the respective processors.

Processors 1270, 1280 may each exchange information with a chipset 1290 via individual P-P interfaces 1252, 1254 using point to point interface circuits 1276, 1294, 1286, 1298. Chipset 1290 may also exchange information with a high-performance graphics circuit 1238 via a high-performance graphics interface 1239.

A shared cache (not shown) may be included in either processor or outside of both processors, yet connected with the processors via P-P interconnect, such that either or both processors' local cache information may be stored in the shared cache if a processor is placed into a low power mode.

Chipset 1290 may be coupled to a first bus 1216 via an interface 1296. In one embodiment, first bus 1216 may be a Peripheral Component Interconnect (PCI) bus, or a bus such as a PCI Express bus or another third generation I/O interconnect bus, although the scope of the present invention is not so limited.

As shown in FIG. 12, various I/O devices 1214 may be coupled to first bus 1216, along with a bus bridge 1218 which couples first bus 1216 to a second bus 1220. In one embodiment, second bus 1220 may be a low pin count (LPC) bus. Various devices may be coupled to second bus 1220 including, for example, a keyboard and/or mouse 1222, communication devices 1227 and a storage unit 1228 such as a disk drive or other mass storage device which may include instructions/code and data 1230, in one embodiment. Further, an audio I/O 1224 may be coupled to second bus 1220. Note that other architectures are possible. For example, instead of the point-to-point architecture of FIG. 12, a system may implement a multi-drop bus or other such architecture.

One or more aspects of at least one embodiment may be implemented by representative data stored on a machine-readable medium which represents various logic within the processor, which when read by a machine causes the machine to fabricate logic to perform the techniques described herein. Such representations, known as "IP cores" may be stored on a tangible, machine readable medium ("tape") and supplied to various customers or manufacturing facilities to load into the fabrication machines that actually make the logic or processor. For example, IP cores, such as the Cortex™ family of processors developed by ARM Holdings, Ltd. and Loongson IP cores developed the Institute of Computing Technology (ICT) of the Chinese Academy of Sciences may be licensed or sold to various customers or licensees, such as Texas Instruments, Qualcomm, Apple, or Samsung and implemented in processors produced by these customers or licensees.

Figure 13:
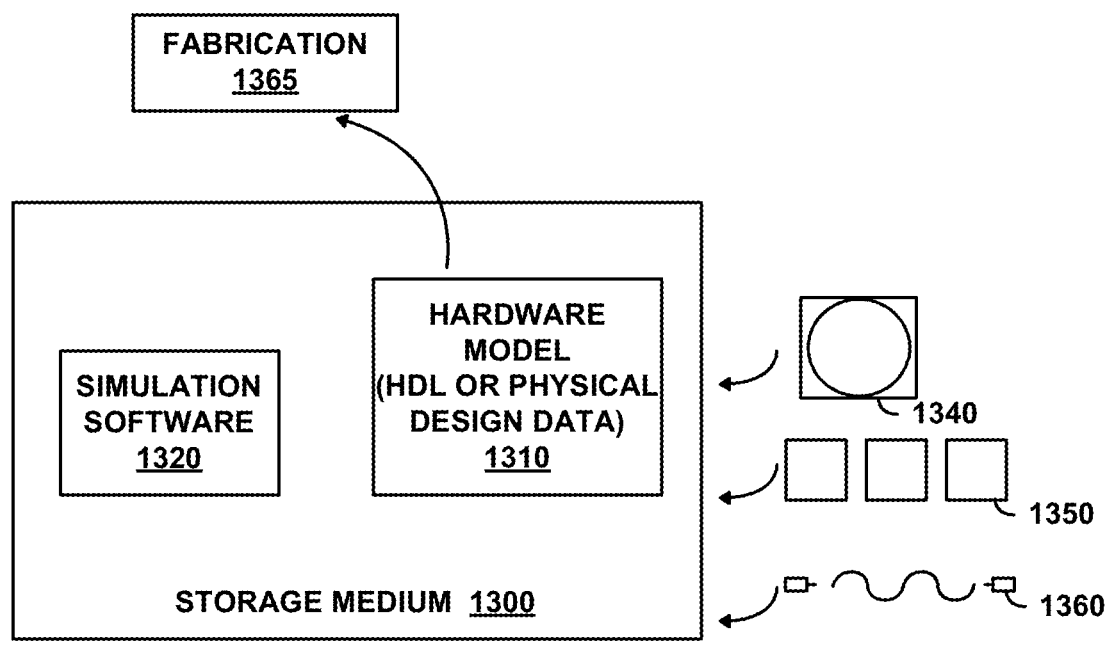
FIG. 13 shows a block diagram illustrating the development of IP cores according to one embodiment of the invention.

FIG. 13 shows a block diagram illustrating the development of IP cores according to one embodiment of the invention. Storage 1300 includes simulation software 1320 and/or hardware or software model 1310. In one embodiment, the data representing the IP core design can be provided to the storage 1330 via memory 1340 (e.g., hard disk), wired connection (e.g., internet) 1350 or wireless connection 1360. The IP core information generated by the simulation tool and model can then be transmitted to a fabrication facility where it can be fabricated by a 3rd party to perform at least one instruction in accordance with at least one embodiment.

In some embodiments, one or more instructions may correspond to a first type or architecture (e.g., x86) and be translated or emulated on a processor of a different type or architecture (e.g., ARM). An instruction, according to one embodiment, may therefore be performed on any processor or processor type, including ARM, x86, MIPS, a GPU, or other processor type or architecture.

Figure 14:
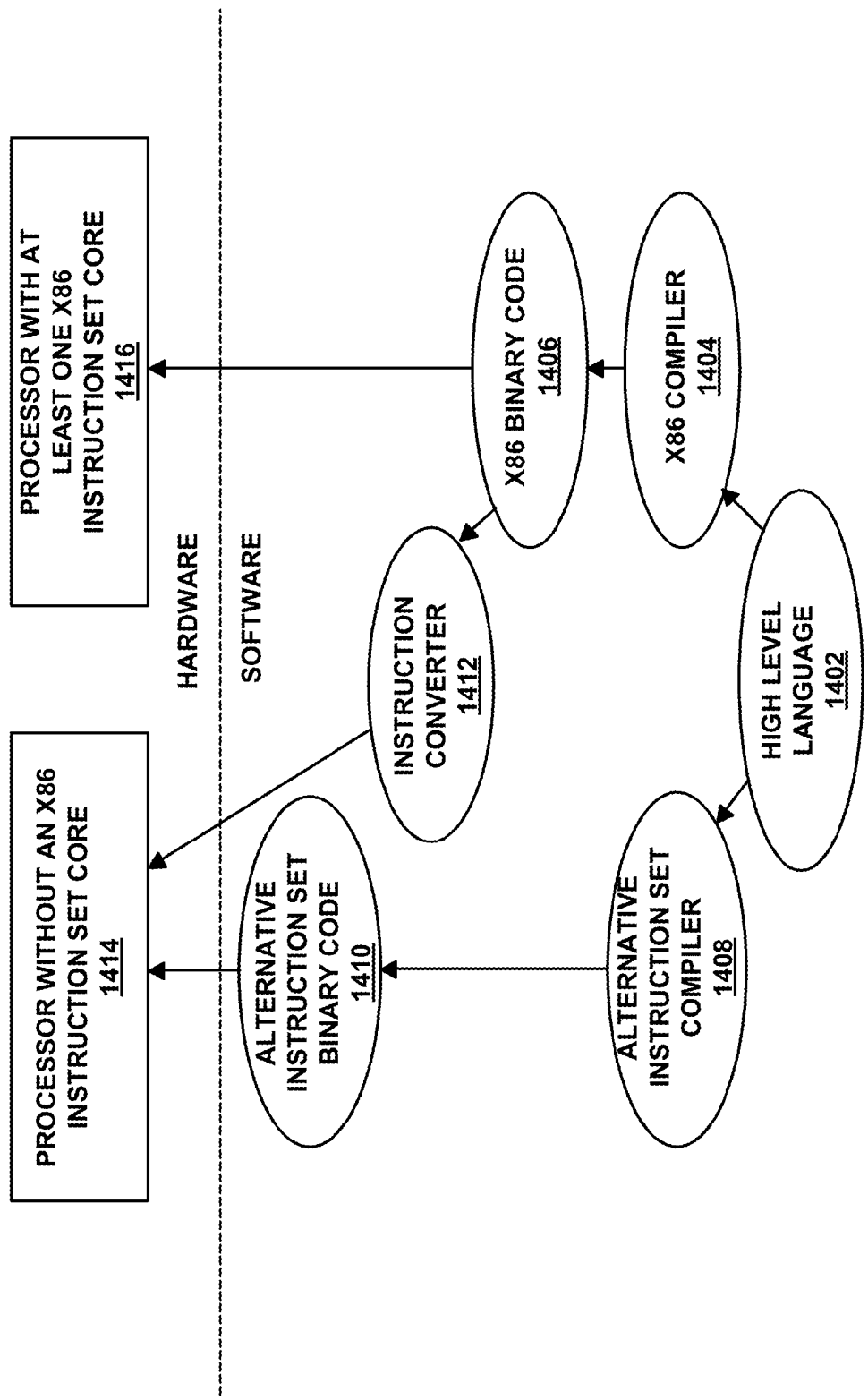
FIG. 14 is a block diagram illustrating the use of a software instruction converter to convert binary instructions in a source instruction set to binary instructions in a target instruction set according to embodiments of the invention.

FIG. 14 is a block diagram illustrating the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof.

FIG. 14 shows a program in a high level language 1402 may be compiled using an x86 compiler 1404 to generate x86 binary code 1406 that may be natively executed by a processor with at least one x86 instruction set core 1416. The processor with at least one x86 instruction set core 1416 represents any processor that can perform substantially the same functions as a Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core.

The x86 compiler 1404 represents a compiler that is operable to generate x86 binary code 1406 (e.g., object code) that can, with or without additional linkage processing, be executed on the processor with at least one x86 instruction set core 1416. Similarly, FIG. 14 shows the program in the high level language 1402 may be compiled using an alternative instruction set compiler 1408 to generate alternative instruction set binary code 1410 that may be natively executed by a processor without at least one x86 instruction set core 1414 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1412 is used to convert the x86 binary code 1406 into code that may be natively executed by the processor without an x86 instruction set core 1414.

This converted code is not likely to be the same as the alternative instruction set binary code 1410 because an instruction converter capable of this is difficult to make; however, the converted code will accomplish the general operation and be made up of instructions from the alternative instruction set. Thus, the instruction converter 1412 represents software, firmware, hardware, or a combination thereof that, through emulation, simulation or any other process, allows a processor or other electronic device that does not have an x86 instruction set processor or core to execute the x86 binary code 1406.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

What is claimed is:

1. A hardware apparatus comprising:
    a processor having a binary translator to perform binary translation of a code having a source binary program order, wherein one or more store instructions of the binary translated code are to be issued in a different order from the source binary program order of the one or more store instructions of the code, and wherein the one or more store instructions of the binary translated code are to be retired in the source binary program order, wherein each store instruction has a store offset indicator to indicate the source binary program order, and the code comprises one or more commit instructions, wherein each commit instruction has a count, and wherein each store instruction is only visible externally if the store offset indicator of the store instruction is smaller or equal to the count of an executed commit instruction, the binary translator, in response to the executed commit instruction, to subtract the store offset indictor of each store instruction by the count when the store offset indicator is bigger than the count; and the binary translator, in response to the executed commit instruction, to subtract the load offset indictor of each load instruction by the count when the load offset indicator is bigger than the count.

2. The apparatus of claim 1, wherein the code comprises one or more load instructions, wherein each load instruction has a load offset indicator, and wherein each store instruction is only visible to each load instruction if the store offset indicator of the store instruction is smaller or equal to the load offset indicator.

3. The apparatus of claim 2, wherein the binary translator to perform the binary translation of the code having the source binary program order is to:

initialize a current store offset indicator to zero;

for each store instruction in the code, increment the current store offset indicator by one; and generate a corresponding store instruction with the current store offset indicator in the binary translated code;

for each load instruction in the code, generate a corresponding load instruction with the current store offset indicator in the binary translated code;

for each commit instruction in the code, generate a corresponding commit instruction with the count in the binary translated code, wherein the count is the number of store instructions between the corresponding commit instruction and a prior commit instruction of the corresponding commit instruction or between the corresponding commit instruction and a beginning of the code if the corresponding commit instruction is a first commit instruction in the code; and for each other instruction that is not a store, load or commit instruction, generate the other instruction.

4. The apparatus of claim 3, wherein the binary translator to perform the binary translation of the code having the source binary program order is further to:

for all store and load instructions in the code that are reordered backwards from a first location in the source binary program order to a second location in the binary translated code, increment the store offset indicator of each store instruction with a sum of the counts of all commit instructions that are located between the first location in the source binary program order and the second location in the binary translated code; and increment the load offset indicator of each load instruction with a sum of the counts of all commit instructions that are located between the first location in the source binary program order and the second location in the binary translated code.

5. The apparatus of claim 3, wherein the binary translator to perform the binary translation of the code having the source binary program order is further to:

for all store and load instructions in the code that are reordered forwards from a first location in the source binary program order to a second location in the binary translated code, decrement the store offset indicator of each store instruction with a sum of the counts of all commit instructions that are located between the first location in the source binary program order and the second location in the binary translated code;

decrement the load offset indicator of each load instruction with a sum of the counts of all commit instructions that are located between the first location in the source binary program order and the second location in the binary translated code; and return an error in response to the decremented store offset indicator being less than or equal to zero and in response to the decremented load offset indicator being less than zero.

6. The apparatus of claim 1, wherein for a first and a second store instruction that are to be made visible externally based on the executed commit instruction, the first and the second store instructions are to be made visible externally at the same time as an atomic event or are to be made visible based on their respective store offset indicators.

7. A system comprising:

a memory; and a processor having logic to perform binary translation of a code having a source binary program order, wherein one or more store instructions of the binary translated code are to be issued in a different order from the source binary program order of the one or more store instructions of the code, and wherein the one or more store instructions of the binary translated code are to be retired in the source binary program order and wherein each store instruction has a store offset indicator to indicate the source binary program order, and the code comprises one or more commit instructions, wherein each commit instruction has a count, and wherein each store instruction is only visible externally if the store offset indicator of the store instruction is smaller or equal to the count of an executed commit instruction, the logic, in response to the executed commit instruction, to subtract the store offset indictor of each store instruction by the count when the store offset indicator is bigger than the count; and the logic, in response to the executed commit instruction, to subtract the load offset indictor of each load instruction by the count when the load offset indicator is bigger than the count.

8. The system of claim 7, wherein the code comprises one or more load instructions, wherein each load instruction has a load offset indicator, and wherein each store instruction is only visible to each load instruction if the store offset indicator of the store instruction is smaller or equal to the load offset indicator.

9. The system of claim 8, wherein the logic to perform the binary translation of the code having the source binary program order is to:

initialize a current store offset indicator to zero;

for each store instruction in the code, increment the current store offset indicator by one; and generate a corresponding store instruction with the current store offset indicator in the binary translated code;

for each load instruction in the code, generate a corresponding load instruction with the current store offset indicator in the binary translated code;

for each commit instruction in the code, generate a corresponding commit instruction with the count in the binary translated code, wherein the count is the number of store instructions between the corresponding commit instruction and a prior commit instruction of the corresponding commit instruction or between the corresponding commit instruction and a beginning of the code if the corresponding commit instruction is a first commit instruction in the code; and for each other instruction that is not a store, load or commit instruction, generate the other instruction.

10. The system of claim 9, wherein the logic to perform the binary translation of the code having the source binary program order is further to:

for all store and load instructions in the code that are reordered backwards from a first location in the source binary program order to a second location in the binary translated code, increment the store offset indicator of each store instruction with a sum of the counts of all commit instructions that are located between the first location in the source binary program order and the second location in the binary translated code; and increment the load offset indicator of each load instruction with a sum of the counts of all commit instructions that are located between the first location in the source binary program order and the second location in the binary translated code.

11. The system of claim 10, wherein the logic to perform the binary translation of the code having the source binary program order is further to:

for all store and load instructions in the code that are reordered forwards from a first location in the source binary program order to a second location in the binary translated code, decrement the store offset indicator of each store instruction with a sum of the counts of all commit instructions that are located between the first location in the source binary program order and the second location in the binary translated code;

decrement the load offset indicator of each load instruction with a sum of the counts of all commit instructions that are located between the first location in the source binary program order and the second location in the binary translated code; and return an error in response to the decremented store offset indicator being less than or equal to zero and in response to the decremented load offset indicator being less than zero.

12. The system of claim 7, wherein for a first and a second store instruction that are to be made visible externally based on the executed commit instruction, the first and the second store instructions are to be made visible externally at the same time as an atomic event or are to be made visible based on their respective store offset indicators.

13. A method comprising:

performing binary translation of a code having a source binary program order, wherein one or more store instructions of the binary translated code are to be issued in a different order from the source binary program order of the one or more store instructions of the code, and wherein the one or more store instructions of the binary translated code are to be retired in the source binary program order and wherein each store instruction has a store offset indicator to indicate the source binary program order and the code comprises one or more commit instructions, wherein each commit instruction has a count, and wherein each store instruction is only visible externally if the store offset indicator of the store instruction is smaller or equal to the count of an executed commit instruction; and executing the binary translated code by subtracting the store offset indictor of each store instruction by the count if the store offset indicator is bigger than the count in response to the executed commit instruction, and subtracting the load offset indictor of each load instruction by the count if the load offset indicator is bigger than the count in response to the executed commit instruction.

14. The method of claim 13, wherein the code comprises one or more load instructions, wherein each load instruction has a load offset indicator, and wherein each store instruction is only visible to each load instruction if the store offset indicator of the store instruction is smaller or equal to the load offset indicator.

15. The method of claim 14, wherein performing the binary translation of the code having the source binary program order comprises:

initializing a current store offset indicator to zero; for each store instruction in the code, incrementing the current store offset indicator by one; and generating a corresponding store instruction with the current store offset indicator in the binary translated code;

for each load instruction in the code, generating a corresponding load instruction with the current store offset indicator in the binary translated code;

for each commit instruction in the code, generating a corresponding commit instruction with the count in the binary translated code, wherein the count is the number of store instructions between the corresponding commit instruction and a prior commit instruction of the corresponding commit instruction or between the corresponding commit instruction and a beginning of the code if the corresponding commit instruction is a first commit instruction in the code; and for each other instruction that is not a store, load or commit instruction, generating the other instruction.

16. The method of claim 15, wherein performing the binary translation of the code having the source binary program order comprises:

for all store and load instructions in the code that are reordered backwards from a first location in the source binary program order to a second location in the binary translated code, incrementing the store offset indicator of each store instruction with a sum of the counts of all commit instructions that are located between the first location in the source binary program order and the second location in the binary translated code; and incrementing the load offset indicator of each load instruction with a sum of the counts of all commit instructions that are located between the first location in the source binary program order and the second location in the binary translated code.

17. The method of claim 16, wherein performing the binary translation of the code having the source binary program order comprises:

for all store and load instructions in the code that are reordered forwards from a first location in the source binary program order to a second location in the binary translated code, decrementing the store offset indicator of each store instruction with a sum of the counts of all commit instructions that are located between the first location in the source binary program order and the second location in the binary translated code;

decrementing the load offset indicator of each load instruction with a sum of the counts of all commit instructions that are located between the first location in the source binary program order and the second location in the binary translated code; and returning an error in response to the decremented store offset indicator being less than or equal to zero and in response to the decremented load offset indicator being less than zero.

18. The method of claim 13, wherein for a first and a second store instruction that are to be made visible externally based on the executed commit instruction, the first and the second store instructions are to be made visible externally at the same time as an atomic event or are to be made visible based on their respective store offset indicators.

* * * * *